(12) United States Patent
Kojima et al.

(10) Patent No.: US 12,392,751 B2
(45) Date of Patent: Aug. 19, 2025

(54) FLUID DEVICE (71) Applicant: SEIKO EPSON CORPORATION, Tokyo (JP)

(72) Inventors: Chikara Kojima, Matsumoto (JP); Tomohide Onogi, Shiojiri (JP); Kanechika Kiyose, Matsumoto (JP); Mitsuru Miyasaka, Shiojiri (JP); Mio Sasaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 587 days.

(21) Appl. No.: 17/388,585

(22) Filed: Jul. 29, 2021

(65) Prior Publication Data
US 2022/0034846 A1 Feb. 3, 2022

(30) Foreign Application Priority Data
Jul. 30, 2020 (JP) .................. 2020-129407

(51) Int. Cl.
*G01N 29/032* (2006.01)
*B01L 3/00* (2006.01)
*G01N 29/22* (2006.01)
*G01P 5/24* (2006.01)

(52) U.S. Cl.
CPC ...... G01N 29/032 (2013.01); B01L 3/502761 (2013.01); G01N 29/221 (2013.01); G01N 29/222 (2013.01); B01L 2400/0439 (2013.01); G01N 2291/011 (2013.01); G01P 5/241 (2013.01)

(58) Field of Classification Search
CPC .......... B01L 2400/0439; G01N 29/032; G01N 29/221; G01N 29/222; G01N 2291/011; G01P 5/241
See application file for complete search history.

(56) References Cited

U.S. PATENT DOCUMENTS 5,892,143 A * 4/1999 Namerikawa ........... G01L 9/008
73/54.27
2013/0010035 A1 1/2013 Norikane et al.
2018/0328956 A1* 11/2018 Hies ........................ G01P 5/245

FOREIGN PATENT DOCUMENTS

JP 2011194675 A 10/2011
JP 2018079470 A 5/2018

OTHER PUBLICATIONS

Ota N, Yalikun Y, Suzuki T, Lee SW, Hosokawa Y, Goda K, Tanaka Y. 2019 Enhancement in acoustic focusing of micro and nanoparticles by thinning a microfluidic device. R. Soc. open sci. 6: 181776.

* cited by examiner

*Primary Examiner* — Krishnan S Menon
*Assistant Examiner* — Tak L Chiu
(74) *Attorney, Agent, or Firm* — CHIP LAW GROUP (57) ABSTRACT

A fluid device includes a flow path through which a fluid flows, and an ultrasonic element that transmits an ultrasonic wave to the fluid to generate a standing wave in the fluid in the flow path along a first direction orthogonal to a flowing direction of the fluid. The ultrasonic element includes a vibrator having a fluid contact surface that comes into contact with the fluid, and a piezoelectric element that is provided at the vibrator and that flexurally vibrates the vibrator in a normal direction of the fluid contact surface. When a thickness of the vibrator in the normal direction is t, a sound velocity of a medium of the fluid is C, an average sound velocity of a longitudinal wave transmitted in the vibrator is C', a dimension of the flow path in the first direction is L, and a mode order of the standing wave is n, the following expression is satisfied.

$$t < \frac{C'}{C} \times \frac{L}{2n}$$

9 Claims, 6 Drawing Sheets

FLUID DEVICE

The present application is based on, and claims priority from JP Application Serial Number 2020-129407, filed Jul. 30, 2020, the disclosure of which is hereby incorporated by reference herein in its entirety.

BACKGROUND

1. Technical Field

The present disclosure relates to a fluid device.

2. Related Art

In related art, a fluid device that performs acoustic convergence on fine particles in a fluid is known.

For example, a fluid device disclosed in "Enhancement in acoustic focusing of micro and nanoparticles by thinning a microfluidic device", Nobutoshi Ota, 6 others, December 2019, Royal Society Open Science, Volume 6, Issue 2, Article No. 181776 includes a flow path substrate such as a glass substrate in which a flow path is formed, and a piezoelectric element provided at the flow path substrate. An ultrasonic wave generated by the piezoelectric element is transmitted to an inside of the flow path via the flow path substrate, and generates a standing wave in a fluid in the flow path. Fine particles in the fluid converge in a predetermined range in the flow path due to a pressure gradient formed by the standing wave.

However, in the fluid device disclosed in "Enhancement in acoustic focusing of micro and nanoparticles by thinning a microfluidic device", since a difference between an acoustic impedance of the fluid and an acoustic impedance of the flow path substrate is large, when the ultrasonic wave generated by the piezoelectric element is propagated from the flow path substrate to the fluid, most of the ultrasonic waves are reflected at a boundary between the flow path substrate and the fluid. Therefore, transmission efficiency of the ultrasonic wave to the fluid is lowered, and as a result, a drive voltage and a driving frequency that are applied to the piezoelectric element for generating the standing wave increase.

SUMMARY

A fluid device according to an aspect of the present disclosure includes: a flow path through which a fluid flows; and an ultrasonic element configured to transmit an ultrasonic wave to the fluid to generate a standing wave in the fluid in the flow path along a first direction orthogonal to a flowing direction of the fluid. The ultrasonic element includes a vibrator having a fluid contact surface that comes into contact with the fluid, and a piezoelectric element that is provided at the vibrator and that is configured to generate flexural vibration to the vibrator in a normal direction of the fluid contact surface. When a thickness of the vibrator in the normal direction is t, a sound velocity of a medium of the fluid is C, an average sound velocity of a longitudinal wave transmitted in the vibrator is C', a dimension of the flow path in the first direction is L, and a mode order of the standing wave is n, the following expression is satisfied.

$$t < \frac{C'}{C} \times \frac{L}{2n}$$

DESCRIPTION OF EXEMPLARY EMBODIMENTS

First Embodiment

Hereinafter, a fluid device 10 according to a first embodiment will be described with reference to FIGS. 1 and 2.

Figure 1:
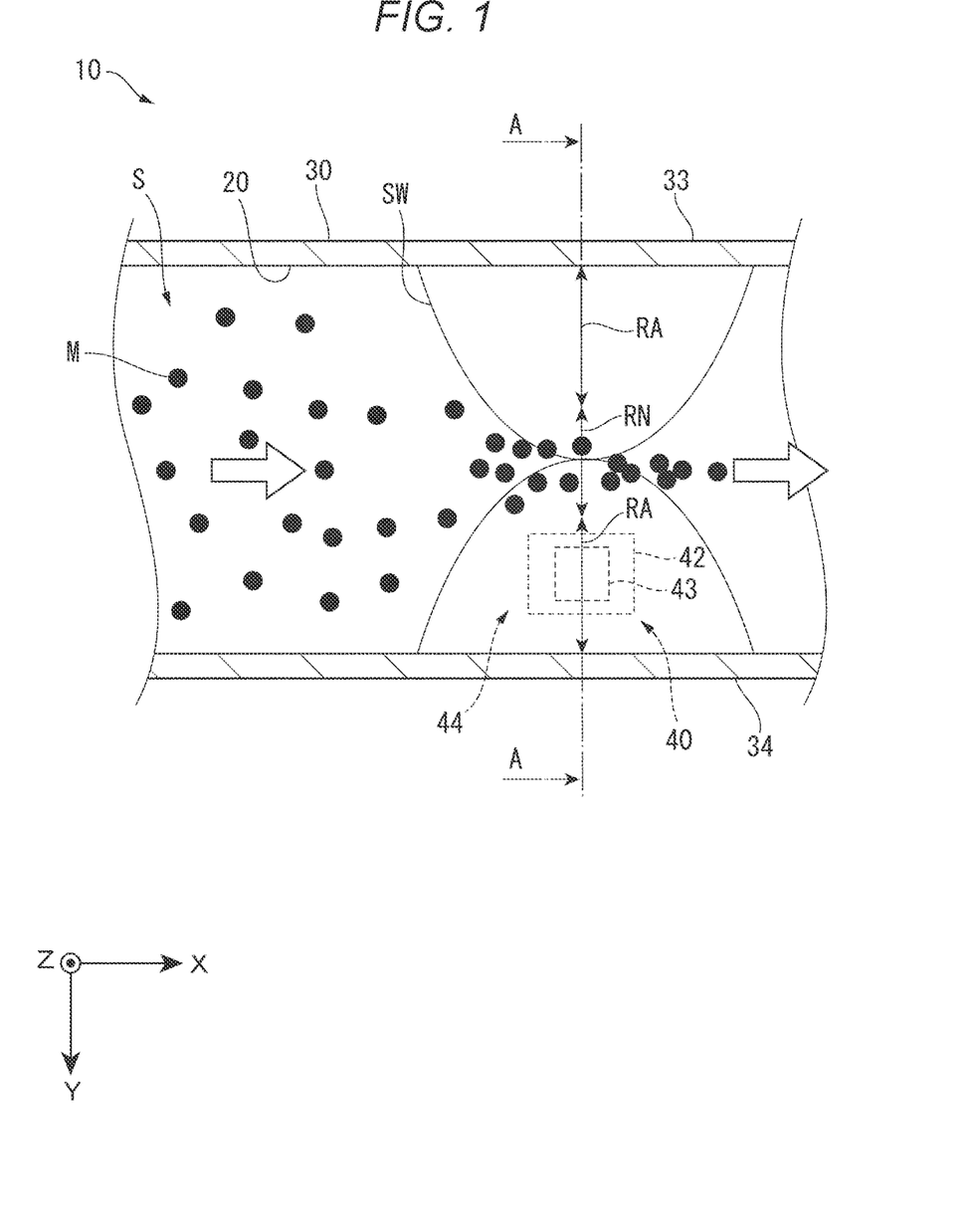
FIG. 1 is a cross-sectional view schematically showing a part of a fluid device according to a first embodiment.
Figure 2:
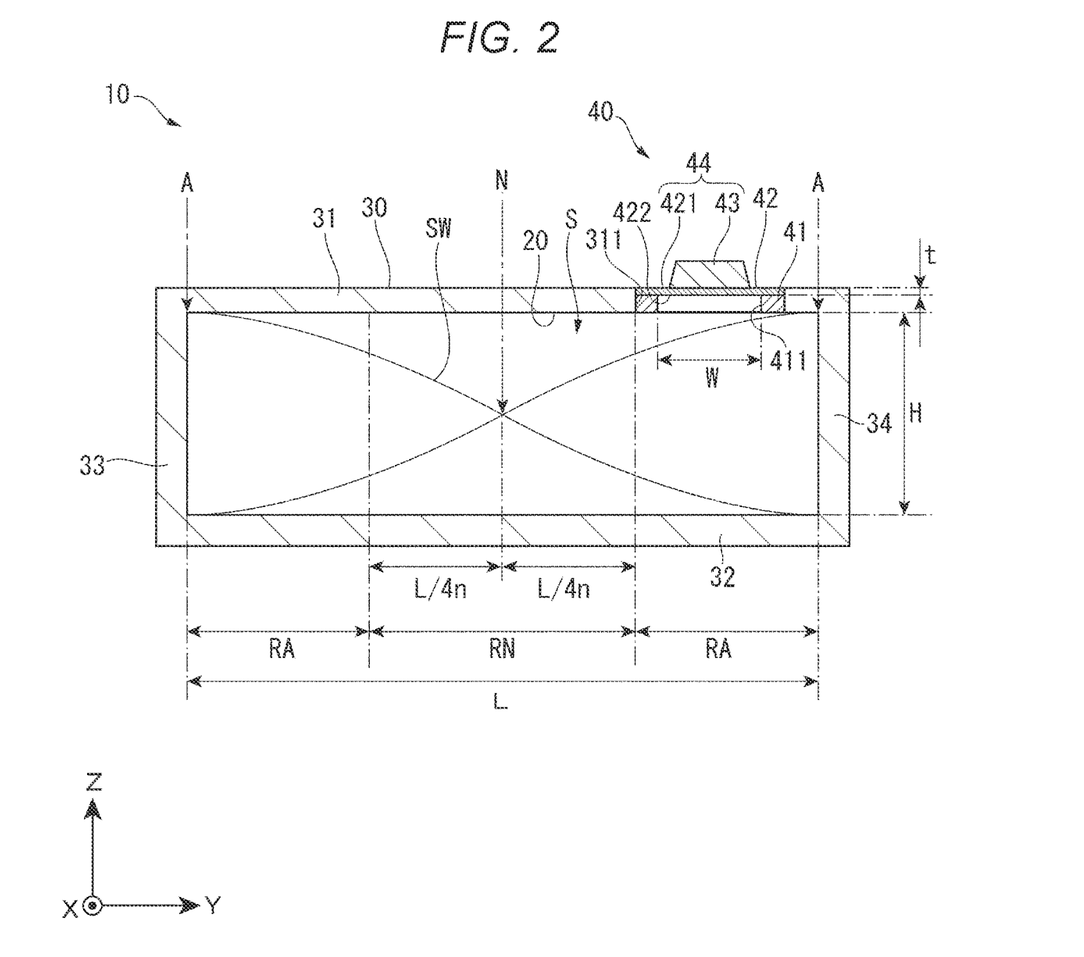
FIG. 2 is a cross-sectional view taken along a line A-A in FIG. 1.

FIG. 1 is a cross-sectional view schematically showing a part of the fluid device 10 according to the first embodiment, and FIG. 2 is a cross-sectional view taken along a line A-A in FIG. 1.

The fluid device 10 includes a flow path substrate 30 in which a flow path 20 is formed, and an ultrasonic wave generation unit 40 provided at the flow path substrate 30.

In the fluid device 10, the ultrasonic wave generation unit 40 applies ultrasonic waves to a fluid S flowing through the flow path 20, thereby generating a standing wave SW with any mode order along one direction orthogonal to a flowing direction of the fluid S. In a process of fine particles M dispersed in the fluid S flowing through the flow path 20, the fine particles M are affected by a pressure gradient formed by the standing wave SW, and are converged in a predetermined range in the flow path 20.

In such a fluid device 10, for example, a concentration of the fine particles M in the fluid S can be increased by providing, in the flow path 20, a concentration flow path through which the fluid S in the predetermined range selectively flows and a discharge flow path through which the fluid S in a range other than the predetermined range selectively flows. In the predetermined range, the fine particles M are converged.

In FIG. 1, a state of the fine particles M converged by the standing wave SW of a first-order mode is schematically illustrated. In FIG. 2, illustration of the fine particles M is omitted, and the standing wave SW generated in the flow path 20 is shown as a pressure waveform.

Configuration of Fluid Device 10

A schematic configuration of the fluid device 10 will be described with reference to FIG. 2.

The flow path substrate 30 is a substrate in which the flow path 20 is formed. The flow path substrate 30 can be formed, for example, by joining a pair of substrates having groove portions corresponding to the flow path 20 to each other. The substrates constituting the flow path substrate 30 are not particularly limited, and for example, a glass substrate or a silicon substrate can be used.

Although not shown, the flow path substrate 30 is formed with an injection port for injecting the fluid S into the flow path 20 and one or more discharge ports for discharging the fluid S from the flow path 20. When the flow path 20 is coupled to each of the concentration flow path and the discharge flow path as described above, each of these flow paths is formed with the discharge port.

In the present embodiment, a cross section of the flow path 20 formed in the flow path substrate 30 is rectangular, and a depth direction of the flow path 20 coincides with a thickness direction of the flow path substrate 30. The flowing direction of the fluid S flowing through the flow path 20 is orthogonal to the depth direction of the flow path 20, and a width direction of the flow path 20 is orthogonal to each of the depth direction of the flow path 20 and the flowing direction of the fluid S.

Hereinafter, the flowing direction of the fluid S is referred to as an X direction, the width direction of the flow path 20 is referred to as a Y direction, and the depth direction of the flow path 20 is referred to as a Z direction. The X, Y, Z directions are orthogonal to one another.

The flow path substrate 30 includes an upper wall portion 31 constituting a wall portion of the flow path 20 on one side in the Z direction, a lower wall portion 32 constituting a wall portion of the flow path 20 on the other side in the Z direction, and side wall portions 33, 34 constituting wall portions of the flow path 20 on both sides in the Y direction. The flow path substrate 30 is formed with a through hole 311 penetrating the upper wall portion 31 in the Z direction.

The ultrasonic wave generation unit 40 is provided at the flow path substrate 30 so as to close the through hole 311 of the flow path substrate 30. Accordingly, the ultrasonic wave generation unit 40 forms a part of the wall portion of the flow path 20.

Specifically, the ultrasonic wave generation unit 40 includes an element substrate 41, a vibration film 42 supported by the element substrate 41, and a piezoelectric element 43 provided at the vibration film 42.

The element substrate 41 is a semiconductor substrate made of Si or the like. The element substrate 41 is disposed in the through hole 311 of the flow path substrate 30 such that a thickness direction of the element substrate 41 is along the Z direction, and an outer peripheral surface of the element substrate 41 is in liquid-tight contact with an inner peripheral surface of the through hole 311 of the flow path substrate 30.

The element substrate 41 is formed with an opening portion 411 penetrating the element substrate 41 along the thickness direction of the element substrate 41.

The vibration film 42 is formed of a laminated body or the like, in which a plurality of types of films are laminated, such as a $SiO_2$ film and a $ZrO_2$ film. The vibration film 42 is supported by the element substrate 41, and closes one side (an opposite side of the opening portion 411 from a flow path 20 side) of the opening portion 411.

A portion of the vibration film 42 that overlaps the opening portion 411 when viewed from the thickness direction of the element substrate 41 constitutes a vibrator 421 that transmits ultrasonic waves. One surface of a pair of surfaces of the vibrator 421 serves as a fluid contact surface 422 that is to be in contact with the fluid S flowing into the opening portion 411 from the flow path 20.

Here, the vibration film 42 is disposed such that the thickness direction (a normal direction of the fluid contact surface 422) of the vibration film 42 is along the Z direction.

The piezoelectric element 43 is provided at an opposite-side surface of the vibrator 421 from the fluid contact surface 422. Although not shown, the piezoelectric element 43 is formed by sequentially laminating a lower electrode, a piezoelectric film, and an upper electrode on the vibrator 421.

In such an ultrasonic wave generation unit 40, an ultrasonic element 44 includes the vibrator 421 and the piezoelectric element 43 disposed on the vibrator 421.

In the ultrasonic element 44, the piezoelectric element 43 is coupled to a drive unit (not shown). When a drive signal is input to the piezoelectric element 43 from the drive unit, a voltage is applied between the lower electrode and the upper electrode, and the piezoelectric film expands and contracts. Accordingly, the vibrator 421 flexurally vibrates in the normal direction of the fluid contact surface 422 at a predetermined oscillation frequency corresponding to a dimension W (an opening width of the opening portion 411) of the vibrator 421 in a short-side direction or the like. The flexural vibration of the vibrator 421 is converted into a compressional wave of the fluid S to propagate the ultrasonic waves. The ultrasonic waves propagated to the fluid S are radially diffused around the vibrator 421, and the ultrasonic waves traveling in the Y direction are repeatedly reflected by inner walls of the flow path 20, thereby generating the standing waves SW in the flow path 20.

Here, in order to generate the standing wave SW in the Y direction in the flow path 20, a flow path width L [m], which is a dimension of the flow path 20 in the Y direction, satisfies the following expression (1).

$$L = \frac{n \times C}{2F} \tag{1}$$

n is the mode order of the standing wave SW, C is a sound velocity [m/sec] of a medium of the fluid S, and F is a driving frequency [Hz] of the piezoelectric element 43. The driving frequency F corresponds to the above-described oscillation frequency of the vibrator 421.

According to the above expression (1), it is assumed that when the sound velocity C of the medium is 1500 m/s when the medium is water, the mode order n of the standing wave SW is 1, and the driving frequency F of the piezoelectric element 43 is 600 kHz, the flow path width L is set to 1.25 mm.

In order to prevent generation of a standing wave in the Z direction in the flow path 20, a flow path depth H [m], which is a dimension of the flow path 20 in the Z direction, satisfies the following expression (2).

$$H < \frac{C}{2F} \tag{2}$$

According to the above expression (2), the flow path depth H is smaller than the flow path width L when the mode order n of the standing wave SW calculated by the above expression (1) is 1. That is, according to the above expressions (1), (2), the flow path 20 is formed such that the flow path depth H is smaller than the flow path width L.

Alternatively, in order to prevent the generation of the standing wave in the Z direction in the flow path 20, the flow path depth H may be set to be significantly larger than the flow path width L set by the above expression (1) without satisfying the above expression (2). In this case, a standing wave of a higher-order mode may be generated in the Z direction. However, such a standing wave of the higher-order mode has an acoustic power smaller than that of the standing wave SW generated in the Y direction, and thus an influence of the standing wave of the higher-order mode can be ignored.

Thickness of Vibrator 421

When the piezoelectric element 43 is driven, not only a transverse wave that causes the flexural vibration of the vibrator 421, but also a longitudinal wave that propagates inside the vibrator 421 is generated.

When a thickness t of the vibrator 421 is larger than a wavelength λ of the longitudinal wave, the longitudinal wave becomes dominant in the vibrator 421, and propagation efficiency of the ultrasonic wave from the vibrator 421 to the fluid S decreases. That is, this is equivalent to a state in which matching of acoustic impedances is not achieved.

Even when the thickness t of the vibrator 421 is smaller than the wavelength λ of the longitudinal wave, the longitudinal wave is slightly generated in the vibration film 42. In particular, when the thickness t of the vibrator 421 is equal to λ/4, the vibrator 421 functions as an acoustic matching layer of the longitudinal wave, and the longitudinal wave generated in the vibrator 421 is easily propagated to the fluid S. However, in a case of acoustic emission using the longitudinal wave, the propagation efficiency of the ultrasonic wave from the vibrator 421 to the fluid S is reduced as compared with a case of acoustic emission using the transverse wave.

Therefore, in the present embodiment, the vibrator 421 is formed such that the thickness t is smaller than ¼ of the wavelength λ of the longitudinal wave. That is, the thickness t [m] of the vibrator 421 satisfies the following expression (3).

$$t < \frac{\lambda}{4} \tag{3}$$

The thickness t of the vibrator 421 is a dimension of the vibrator 421 along the normal direction with respect to the fluid contact surface 422, and corresponds to a film thickness of the vibration film 42.

The wavelength λ [m] of the longitudinal wave in the above expression (3) is expressed by the following expression (4).

$$\lambda = \frac{C'}{F} \tag{4}$$

In the above expression (4), C' is an average sound velocity [m/sec] of the longitudinal wave generated in the vibrator 421, and F is the driving frequency [Hz] of the piezoelectric element 43.

According to the above expression (4), the above expression (3) is expressed by the following expression (5).

$$t < \frac{C'}{4F} \tag{5}$$

The driving frequency F in the above expression (5) satisfies the following expression (1) as described above.

$$L = \frac{n \times C}{2F} \tag{1}$$

In the above expression (1), L is the flow path width [m], n is the mode order of the standing wave SW, C is the sound velocity [m/s] of the medium of the fluid S, and F is the driving frequency [Hz] of the piezoelectric element 43.

According to the above expressions (1), (5), the thickness t of the vibrator 421 satisfies the following expression (6).

$$t < \frac{C'}{C} \times \frac{L}{2n} \tag{6}$$

The vibration film 42 according to the present embodiment is a laminated body of a plurality of films. That is, the vibrator 421 according to the present embodiment is constituted by a plurality of films. In this case, the average sound velocity C' of the longitudinal wave generated in the vibrator 421 is calculated according to the following method.

Here, when the number of films constituting the vibrator 421 is m, a thickness of each film constituting the vibrator 421 is $t_k$ (k=1, 2, . . . m), and an average of the longitudinal wave sound velocities in each film constituting the vibrator 421 is $C_k$ (k=1, 2, . . . m), the following expression (7) is established.

$$\frac{t}{C'} = \sum_{k=1}^{m} \frac{t_k}{C_k} \tag{7}$$

The thickness t of the vibrator 421 is expressed by the following expression (8).

$$t = \Sigma_{k=1}^{m} t_k \tag{8}$$

Therefore, according to the above expressions (7), (8), the average sound velocity C' of the longitudinal wave generated in the vibrator 421 is expressed by the following expression (9).

$$C' = \frac{\sum_{k=1}^{m} t_k}{\sum_{k=1}^{m} \frac{t_k}{C_k}} \tag{9}$$

From a viewpoint of improving the propagation efficiency of the ultrasonic wave from the vibrator 421 to the fluid S, it is desirable that the thickness t of the vibrator 421 is a smaller value while satisfying the above expression (6).

However, when the thickness t of the vibrator 421 becomes too small, a stress gradient in the thickness direction of the vibrator 421 becomes large, and thus, when the piezoelectric element 43 is driven, there is a high chance that the vibrator 421 is damaged.

Therefore, in the present embodiment, as a result of an experiment in which the piezoelectric element 43 is driven by changing the dimension W of the vibrator 421 in the short-side direction and the thickness t of the vibrator 421, it is preferable that the thickness t of the vibrator 421 satisfies the following expression (10).

$$8.03 \times 10^{-3} \times W \times E'^{-\frac{1}{3}} \times \left(\frac{n}{2} \times \frac{C}{L}\right) \leq t \tag{10}$$

In the above expression (10), W is the dimension [m] of the vibrator 421 in the short-side direction, E' is an average Young's modulus [Pa] of the vibrator 421 when a Poisson's ratio is 0.3, n is the mode order of the standing wave SW, and C is the sound velocity [m/sec] of the medium of the fluid S. When the thickness t of the vibrator 421 is smaller than a thickness obtained by a left side of the above expression (10), there is a high chance that the vibrator 421 is damaged.

As described above, the vibrator 421 according to the present embodiment is constituted by a plurality of (m) films. In this case, the average Young's modulus E' of the vibrator 421 can be expressed by the following expression (11).

$$E' = \frac{4}{d_m^m} \sum\nolimits_{k=1}^{i} E_i \{(d_i - \alpha)^m - (d_{i-1} - \alpha)^m\} \tag{11}$$

α in the above expression (11) is defined by the following expression (12).

$$\alpha = \sum\nolimits_{k=1}^{m} \frac{E_i(d_i^2 - d_{i-1}^2)}{2E_i(d_i - d_{i-1})} \tag{12}$$

In the above expressions (11), (12), m is the number of films constituting the vibrator 421, and $E_i$ (i=1, 2, ... m) is the Young's modulus of each film constituting the vibrator 421 when the Poisson's ratio is 0.3.

$d_i$ is expressed by the following expression (13).

$$d_i = \sum\nolimits_{k=1}^{i} t_k \tag{13}$$

In the above expression (13), $t_k$ (k=1, 2, ... m) is the thickness of each film constituting the vibrator 421. That is, $d_i$ is a value obtained by adding the thicknesses $t_k$ of the films constituting the vibrator 421 up to an i-th thickness.

Here, when the fluid device 10 according to the present embodiment has the following configuration, it is preferable that the thickness t of the vibrator 421 falls within a range of the following expression (14) using the expression (6) and the expression (10) described above.

Dimension W of vibrator in short-side direction: 19 μm
Flow path width L: 375 μm
Sound velocity C of medium of fluid S: 1500 m/s
Mode order n of standing wave SW: 1
Vibration film 42: two-layer structure of SiO₂ film and ZrO₂ film
Film thickness t1 of SiO₂ film: 0.35 μm
Film thickness t2 of ZrO₂ film: 0.15 μm
Young's modulus $E_1$ of SiO₂: 75 GPa
Young's modulus $E_2$ of ZrO₂: 190 GPa
Sound velocity $C_1$ of SiO₂: 5900 m/s
Sound velocity $C_2$ of ZrO₂: 4650 m/s $$0.5 \times 10^{-6} \text{ (m)} \leq t < 685 \times 10^{-6} \text{ (m)} \tag{14}$$

Arrangement of Ultrasonic Element 44

When the standing wave SW in the Y direction is generated inside the flow path 20, an antinode A at which an acoustic pressure becomes maximum and a node N at which the acoustic pressure becomes 0 periodically appear along the Y direction. In the present embodiment, the antinode A appears at each of both end portions of the flow path 20 in the Y direction.

For example, as shown in FIG. 2, when the standing wave SW of the first-order mode is generated, the node N appears at a center portion of the flow path 20 in the Y direction, and the antinode A appears at each of both end portions of the flow path 20 in the Y direction. In this case, in the process of the fine particles M dispersed in the fluid S flowing through the flow path 20, the fine particles M are converged to a range corresponding to the node N of the standing wave SW, that is, the center portion of the flow path 20 in the Y direction (acoustic convergence).

Here, the flow path 20 is divided into, in the Y direction, a node region RN corresponding to the node N of the standing wave SW and antinode regions RA corresponding to the antinodes A of the standing wave SW.

When the flow path width of the flow path 20 is L and the mode order of the standing wave SW is n, each node region RN is in a range from a center of each node N to ±L/4n in the Y direction, and each antinode region RA is in a range other than the range of the node region RN.

With respect to the flow path 20 divided into the regions in this way, the ultrasonic element 44, specifically, the fluid contact surface 422 of the vibrator 421 faces any antinode region RA in the Z direction. In other words, the opening portion 411 of the element substrate 41 opens toward the antinode region RA.

Depending on a size of the ultrasonic element 44, the ultrasonic element 44 may be present not only in the antinode region RA but also in the node region RN. However, it is desirable that the vibrator 421 not face the node N.

FIG. 2 shows the standing wave SW of the first-order mode, but the standing wave SW generated in the present embodiment may be any standing wave of an order mode equal to or greater than the first-order mode.

Effects of Present Embodiment

As described above, the fluid device 10 according to the present embodiment includes the flow path 20 through which the fluid S flows, and the ultrasonic element 44 that transmits ultrasonic waves to the fluid S to generate the standing wave SW in the fluid S in the flow path 20 along a first direction (Y direction) orthogonal to the flowing direction of the fluid S. The ultrasonic element 44 includes the vibrator 421 having the fluid contact surface 422 that comes into contact with the fluid S, and the piezoelectric element 43 that is provided at the vibrator 421 and that flexurally vibrates the vibrator 421 in the normal direction of the fluid contact surface 422. Further, when the thickness [m] of the vibrator 421 is t, the sound velocity [m/s] of the medium of the fluid S is C, the sound velocity [m/s] of the longitudinal wave of the vibrator 421 is C', the dimension [m] of the flow path 20 in the Y direction is L, and the mode order of the standing wave SW is n, the fluid device 10 satisfies the following expression (6).

$$t < \frac{C'}{C} \times \frac{L}{2n} \tag{6}$$

In such a configuration, since the fluid contact surface 422 of the vibrator 421 is in contact with the fluid S, the flow path substrate 30 is not interposed in a propagation path of the ultrasonic wave from the ultrasonic element 44 to the fluid S. That is, the ultrasonic wave is directly transmitted from the ultrasonic element 44 to the fluid S.

The thickness of the vibrator 421 in contact with the fluid S is formed in a range of the above expression (6), so that the generation of the longitudinal wave in the vibrator 421 and the propagation of the longitudinal wave from the vibrator 421 to the fluid S are prevented.

According to the above configuration, the matching of the acoustic impedances between the vibrator 421 of the ultrasonic element 44 and the fluid S in contact with the vibrator 421 is achieved, so that propagation efficiency of the ultrasonic wave from the ultrasonic element 44 to the fluid S can be improved. Accordingly, a drive voltage and the driving frequency that are applied to the piezoelectric element 43 can be set to be lower than those in the related art, and the width of the flow path 20 in which the standing wave SW is generated can be wider than that in the related art. As a result, a volume flow rate of the fluid S that can be treated using the fluid device 10 can be increased.

When the dimension [m] of the vibrator 421 in the short-side direction is W, the average Young's modulus [Pa] of the vibration film when the Poisson's ratio is 0.3 is E', and the sound velocity [m/sec] of the medium of the fluid is C, the fluid device 10 according to the present embodiment satisfies the following expression (10).

$$8.03 \times 10^{-3} \times W \times E'^{-\frac{1}{3}} \times \left(\frac{n}{2} \times \frac{C}{L}\right) \leq t \quad (10)$$

According to such a configuration, by forming the vibrator 421 as thin as possible, the vibrator 421 can be prevented from being damaged when the piezoelectric element 43 is driven while the propagation efficiency of the ultrasonic wave from the ultrasonic element 44 to the fluid S is improved.

In the fluid device 10 according to the present embodiment, the vibrator 421 faces the antinode region RA corresponding to any antinode A in the standing wave SW.

According to such an arrangement, the propagation efficiency of the ultrasonic wave from the ultrasonic element 44 to the fluid S can be further improved.

In the fluid device 10 according to the present embodiment, the dimension (flow path depth) H of the flow path 20 in the Z direction (second direction orthogonal to each of the flowing direction and the first direction) is smaller than the dimension (flow path width) of the flow path 20 in the Y direction.

Accordingly, the generation of the standing wave in the Z direction can be prevented, and the standing wave SW in the Y direction can be suitably generated.

Second Embodiment

Next, a second embodiment will be described.

Figure 3:
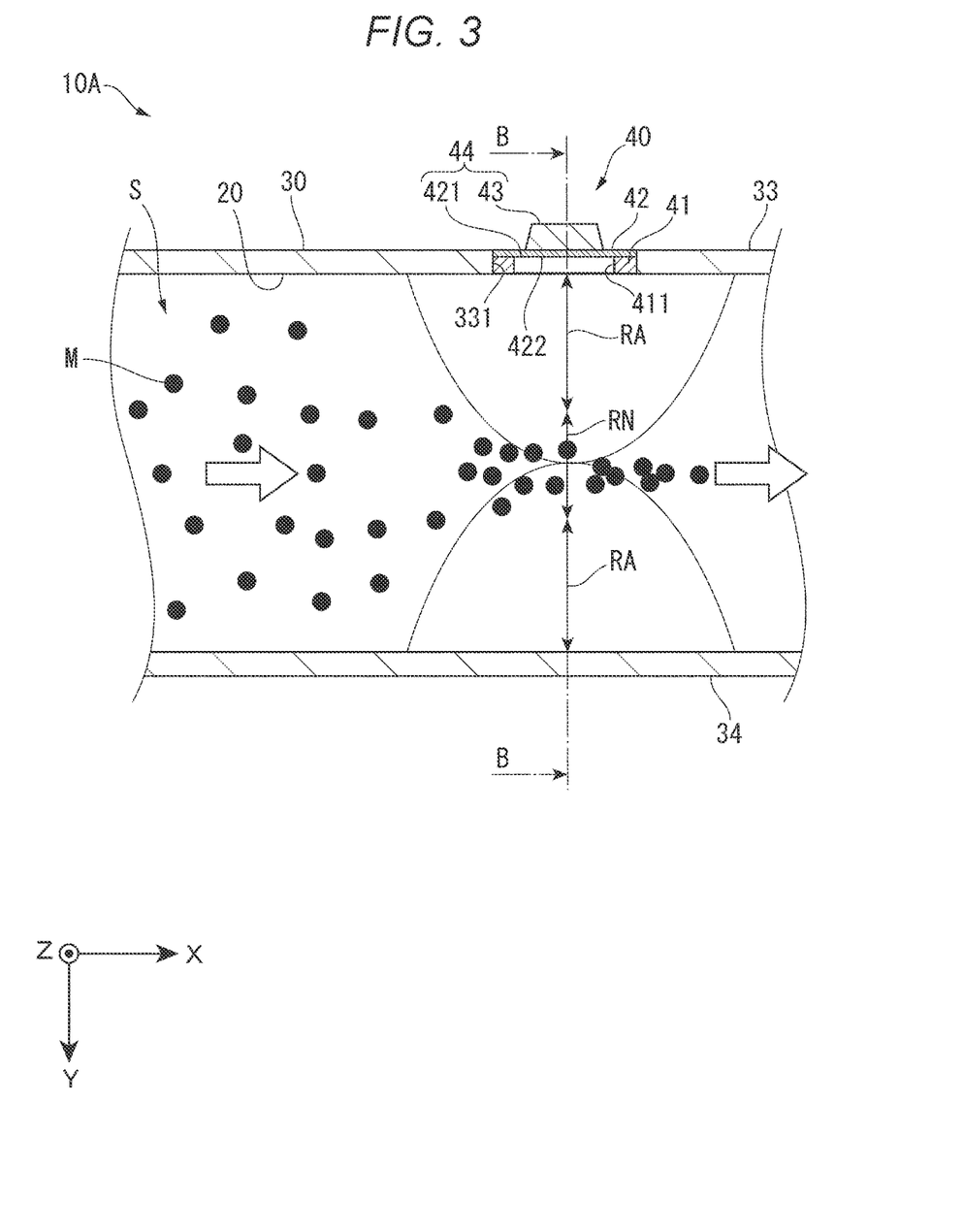
FIG. 3 is a cross-sectional view schematically showing a part of a fluid device according to a second embodiment.
Figure 4:
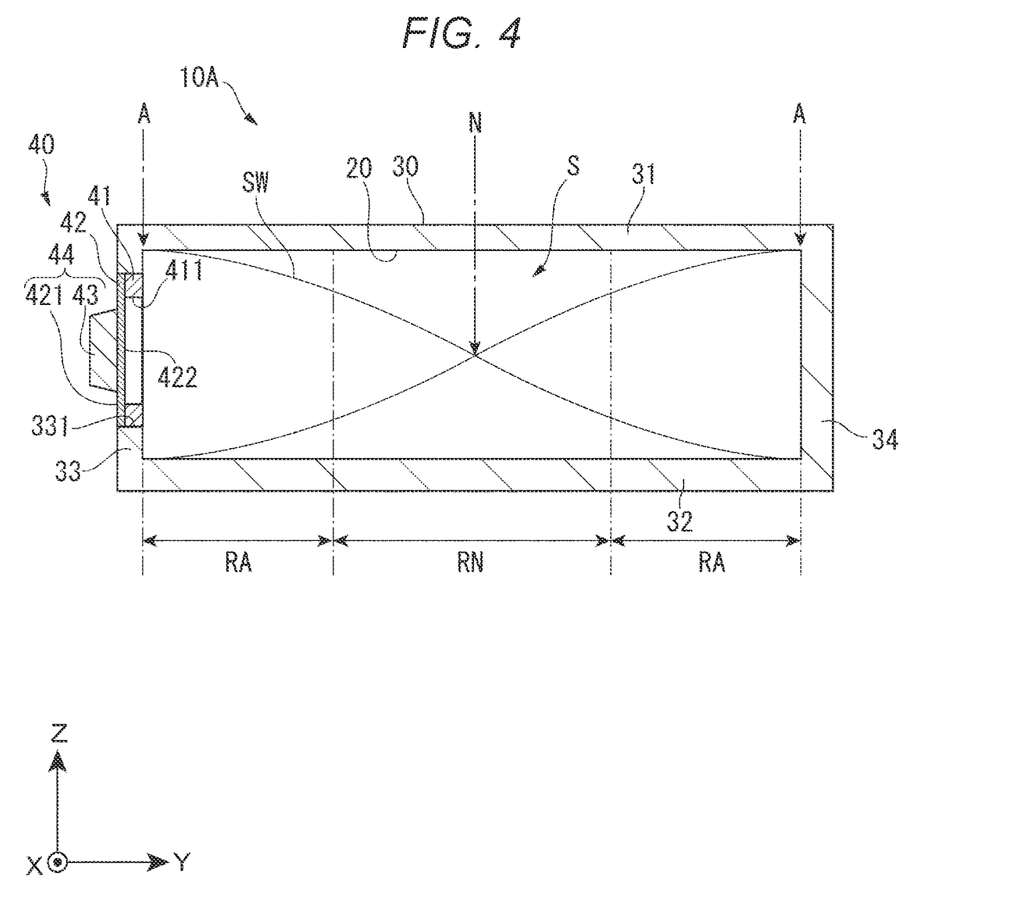
FIG. 4 is a cross-sectional view taken along a line B-B in FIG. 3.

FIG. 3 is a cross-sectional view schematically showing a part of a fluid device 10A according to the second embodiment, and FIG. 4 is a cross-sectional view taken along a line B-B in FIG. 3.

The fluid device 10A according to the second embodiment has substantially the same configuration as the fluid device 10 according to the first embodiment except for the arrangement of the ultrasonic wave generation unit 40 with respect to the flow path substrate 30.

In the following description, the same components as the first embodiment are denoted by the same reference numerals, and the description thereof will be omitted or simplified.

In the second embodiment, a through hole 331 penetrating the side wall portion 33 in the Y direction is formed in the flow path substrate 30.

The ultrasonic wave generation unit 40 is provided at the flow path substrate 30 so as to close the through hole 331 of the side wall portion 33, thereby forming a part of the wall portion of the flow path 20. The ultrasonic element 44 is disposed such that the thickness direction of the vibrator 421 is along the Y direction, and the vibrator 421 faces the antinode region RA of the flow path 20 in the Y direction.

Effects of Second Embodiment

According to the above-described second embodiment, the same effects as the fluid device 10 according to the first embodiment can be achieved.

In the second embodiment, since the ultrasonic element 44 is disposed such that the thickness direction of the vibrator 421 is along the Y direction, the main transmission direction of the ultrasonic wave from the ultrasonic element 44 coincides with the propagation direction of the ultrasonic wave combining the standing waves SW in the flow path 20. Accordingly, it is possible to further improve the generation efficiency of the standing wave SW.

Third Embodiment

Next, a third embodiment will be described.

Figure 5:
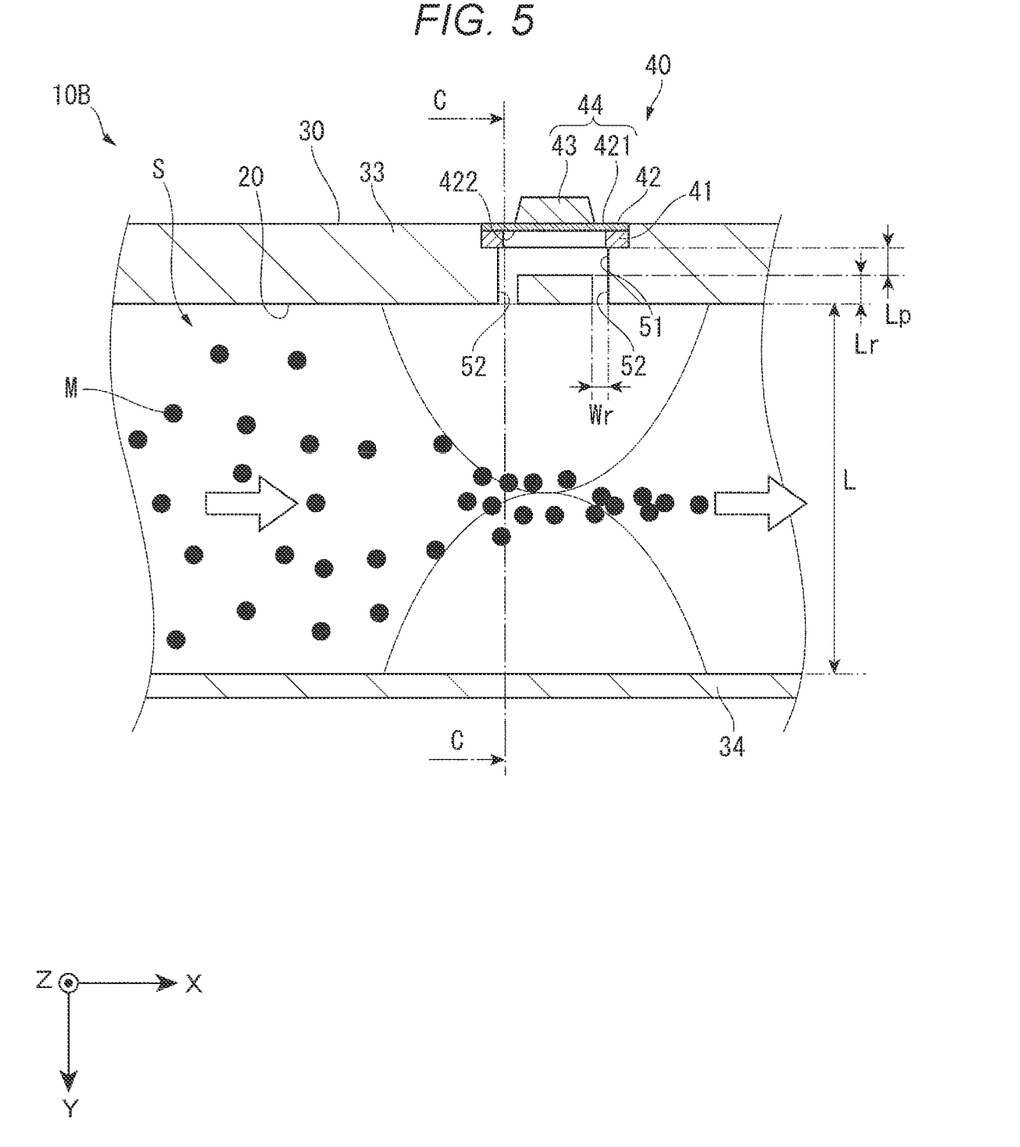
FIG. 5 is a cross-sectional view schematically showing a part of a fluid device according to a third embodiment.
Figure 6:
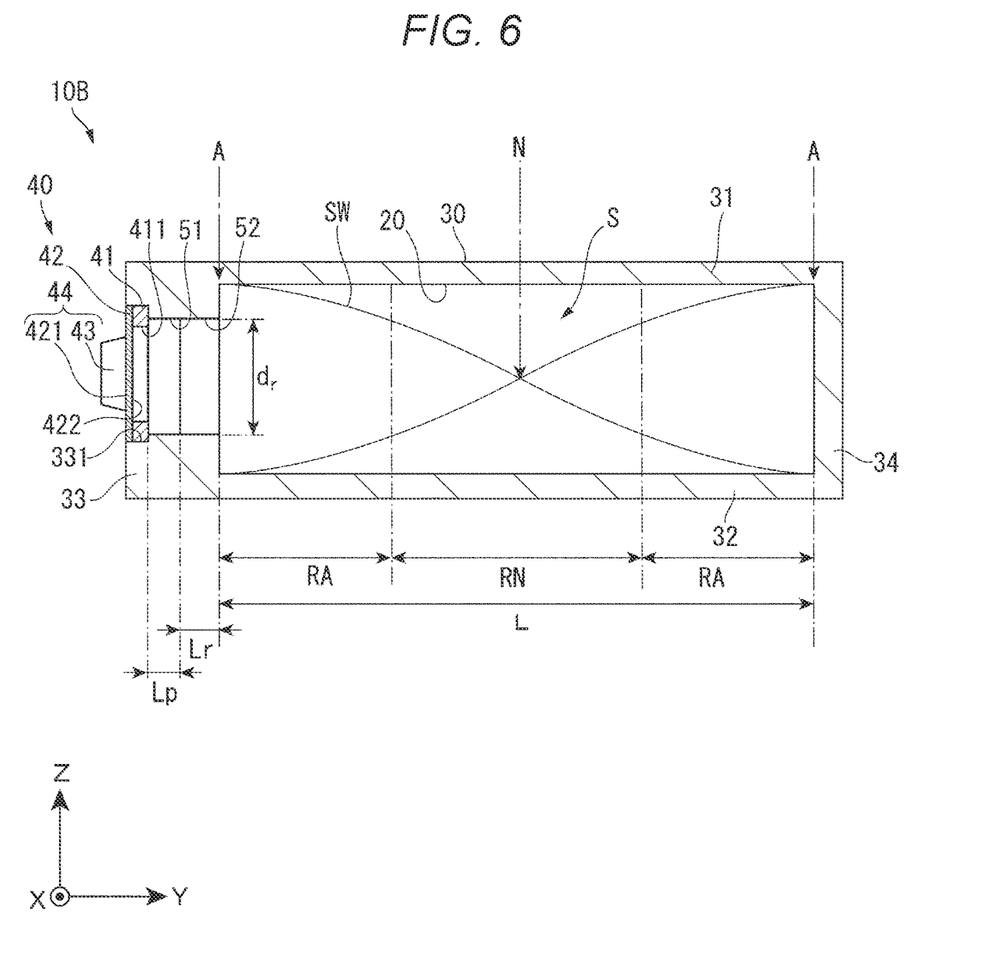
FIG. 6 is a cross-sectional view taken along a line C-C in FIG. 5.

FIG. 5 is a cross-sectional view schematically showing a part of a fluid device 10B according to the third embodiment, and FIG. 6 is a cross-sectional view taken along a line C-C in FIG. 5.

The fluid device 10B according to the third embodiment has substantially the same configuration as the fluid device 10A according to the second embodiment except that a pressure chamber 51 and a communication path 52 are interposed between the ultrasonic wave generation unit 40 and the flow path 20.

In the following description, the same components as the first and the second embodiments are denoted by the same reference numerals, and the description thereof will be omitted or simplified.

The pressure chamber 51 is a storage chamber of the fluid S formed in the flow path substrate 30, and is spaced apart from the flow path 20 in the Y direction. In the present embodiment, the pressure chamber 51 is formed in the side wall portion 33 on one side of the flow path 20 in the Y direction, and may be formed in the side wall portion 34 on the other side of the flow path 20 in the Y direction.

The communication path 52 is a flow path that is formed inside the side wall portion 33 of the flow path substrate 30 and communicates the pressure chamber 51 with the flow path 20. The communication path 52 is formed along the Y direction and is coupled to a side portion of the flow path 20.

The flow path 20 is coupled to the pressure chamber 51 via the communication path 52, and the fluid S flowing through the flow path 20 flows into the pressure chamber 51. The pressure chamber 51 is filled with the fluid S.

In FIGS. 5 and 6, two communication paths 52 are provided, and each communication path 52 communicates the pressure chamber 51 with the flow path 20. However, the number of communication paths 52 is not limited to two, and may be one or more.

A through hole 332 that connects the pressure chamber 51 and the outside in the Y direction is formed in a portion of the side wall portion 33 of the flow path substrate 30. The portion is a wall portion of the pressure chamber 51. The ultrasonic wave generation unit 40 is provided at the flow path substrate 30 so as to close the through hole 332, thereby forming a part of the wall portion of the pressure chamber 51. The element substrate 41 is disposed in the through hole 332 of the flow path substrate 30 such that the thickness direction of the element substrate 41 is along the Y direction, and the outer peripheral surface of the element substrate 41 is in liquid-tight contact with an inner peripheral surface of the through hole 332 of the flow path substrate 30.

Here, the ultrasonic element 44 is disposed such that the thickness direction of the vibrator 421 is along the Y direction, and the vibrator 421 faces the antinode region RA of the flow path in the Y direction via the pressure chamber 51 and the communication path 52. The fluid contact surface 422 of the vibrator 421 is in contact with the fluid S in the pressure chamber 51.

Since the standing wave is generated in the fluid S in the flow path 20, and the standing wave is not generated in the fluid S in the communication path 52 and the pressure chamber 51, the fluid device 10B according to the third embodiment satisfy the following expression (15).

$$Lr + Lp \neq \frac{L \times M}{n} \qquad (15)$$

In the above expression (15), Lr is a dimension [m] of the communication path 52 in the Y direction, Lp is a dimension [m] of the pressure chamber 51 in the Y direction, M is a natural number, n is the mode order of the standing wave SW, and L is the dimension (flow path width) [m] of the flow path 20 in the Y direction.

The fluid device 10B according to the third embodiment satisfies the following expressions (16) to (18).

$$w_r < 4 \times L \times n^{-\frac{1}{2}} \qquad (16)$$

$$W_r \leq 0.3 \times d_r \qquad (17)$$

$$\frac{Sr \times L}{n} \geq \delta \times Sb \qquad (18)$$

In the above expressions (16), (17), $W_r$ is a width [m] of the communication path 52 in the X direction, L is the flow path width [m], n is the mode order of the standing wave SW, and $d_r$ is a depth [m] of the communication path 52 in the Z direction.

In a case where the above expressions (16), (17) are satisfied, when an ultrasonic wave emitted from the communication path 52 into the flow path 20 is reflected by a wall surface of the flow path 20 and returns to the communication path 52, a beam width of the ultrasonic wave becomes larger than the width $W_r$ of the communication path 52. That is, the beam width of the ultrasonic wave spreads wider than the width $W_r$ of the communication path 52.

In the above expression (18), Sr is a flow path cross-sectional area [m²] of all the communication paths 52 orthogonal to the Y direction, L is the flow path width [m], n is the mode order of the standing wave SW, Sb is an area [m²] of the fluid contact surface 422 of the vibrator 421, and δ is a displacement amount [m] of the vibrator 421 at the time of the vibration.

When the expression (18) is satisfied, a value obtained by dividing a volume of a range in the flow path 20 facing the communication path 52 in the Y direction by the mode order n of the standing wave SW is equal to or greater than a maximum variation amount of a volume of the pressure chamber 51 caused by the flexural vibration of the vibrator 421.

Effects of Third Embodiment

According to the above-described third embodiment, the same effects as the fluid device 10 according to the first embodiment and the fluid device 10A according to the second embodiment can be achieved.

Here, in the first to third embodiments, since the vibrator 421 faces the fluid S, the ultrasonic element 44 directly transmits ultrasonic waves to the fluid S. The ultrasonic wave transmitted in the fluid S forms the standing wave SW by being reflected by the wall surface of the flow path 20 while the acoustic power is not substantially attenuated.

In the first embodiment and the second embodiment described above, since the vibrator 421 faces the fluid S in the flow path 20, the ultrasonic wave reflected in the flow path 20 directly returns to the vibrator 421. Therefore, unless the ultrasonic element 44 transmits an ultrasonic wave having an acoustic power equal to or higher than an initially applied acoustic power, the ultrasonic element 44 may be defeated by the reflected and returned ultrasonic wave, and it is difficult to superimpose the acoustic power of the ultrasonic wave in the flow path 20. That is, the acoustic power of the ultrasonic wave in the flow path 20 is determined by an acoustic power of a first transmitted ultrasonic wave, and it is difficult to add the acoustic power.

On the other hand, the fluid device 10B according to the third embodiment further includes the pressure chamber 51 that stores the fluid S, and the communication path 52 that is formed along the Y direction and that communicates the flow path 20 with the pressure chamber 51, and the ultrasonic element 44 is disposed such that the fluid contact surface 422 of the vibrator 421 is in contact with the fluid S in the pressure chamber 51.

According to the third embodiment, a part of the ultrasonic wave reflected by the wall surface of the flow path 20 returns to the vibrator 421 via the communication path 52, but a remaining part of the ultrasonic wave is reflected again by the wall surface of the flow path 20. That is, it is possible to reduce a proportion of the ultrasonic wave returning to the vibrator 421. Therefore, the ultrasonic wave transmitted by the ultrasonic element 44 is not defeated by the ultrasonic wave returning to the vibrator 421 via the communication path 52, and the pressure in the pressure chamber 51 is increased, so that the acoustic power can be added to the inside of the flow path 20. Accordingly, it is easy to generate the standing wave SW having a higher acoustic power.

In particular, the fluid device 10B according to the third embodiment satisfies the above expressions (16), (17), so that the beam width of the ultrasonic wave is larger than the width $W_r$ of the communication path 52. Therefore, the effect of reducing the proportion of the ultrasonic wave returning to the vibrator 421 can be suitably exhibited.

Further, in the third embodiment, the fluid device 10B is formed such that the above expression (18) is established. Here, the value obtained by dividing the volume of the range in the flow path 20 facing the communication path 52 in the Y direction by the mode order n of the standing wave SW corresponds to a volume variation of a medium in the communication path 52. When the value is equal to or larger than the maximum variation amount of the volume of the pressure chamber 51 caused by the flexural vibration of the vibrator 421, the volume variation of the medium in the pressure chamber 51 due to deformation of the vibration film 42 is discharged as a volume variation of a medium in the communication path 52, and thus it is possible to prevent the pressure increase in the pressure chamber 51. Therefore, it is possible to prevent the vibration film 42 and the piezoelectric element 43 from being damaged.

Modifications

The present disclosure is not limited to the embodiment described above, and configurations obtained through modifications, alterations, and appropriate combinations of the embodiments within a scope of being capable of achieving the object of the present disclosure are included in the present disclosure.

First Modification

In each of the above embodiments, the examples are described in which one ultrasonic element 44 is provided in the fluid devices 10, 10A, 10B. However, a plurality of ultrasonic elements 44 may be provided in the fluid devices 10, 10A, 10B.

For example, a plurality of opening portions 411 are formed in an array for the element substrate 41, and a portion of the vibration film 42 provided at the element substrate 41 overlapping each opening portion 411 may constitute the vibrator 421. In this case, the plurality of ultrasonic elements 44 are formed by providing the piezoelectric element 43 for each vibrator 421.

A plurality of ultrasonic wave generation units 40 as described in each of the above embodiments may be provided.

In the above-described third embodiment, when the plurality of ultrasonic elements 44 are provided, Sb in the above expression (18) is a total area of the fluid contact surfaces 422 of the plurality of ultrasonic elements 44.

Second Modification

In the first embodiment and the second embodiment, the example is described in which the ultrasonic element 44 is disposed for one antinode region RA of the standing wave SW formed in the flow path 20. However, the ultrasonic element 44 may be disposed for each of two or more antinode regions RA.

However, in the antinodes A appearing on both sides of the node N of the standing wave SW, phases of pressure waveforms are opposite to each other.

Therefore, it is desirable to reverse a phase of a driving frequency between the ultrasonic element 44 disposed for the antinode region RA corresponding to one antinode A and the ultrasonic element 44 disposed for the antinode region RA corresponding to the other antinode A.

Third Modification

In the third embodiment, the ultrasonic element 44 is disposed such that the thickness direction of the vibrator 421 is along the Y direction. However, the present disclosure is not limited thereto.

For example, in the third embodiment, the through hole in the Z direction may be formed in the portion of the flow path substrate 30 that is the wall portion of the pressure chamber 51, the ultrasonic wave generation unit 40 may be provided so as to close the through hole, and the ultrasonic element 44 may be disposed such that the thickness direction of the vibrator 421 is along the Z direction.

In this case, a component of the ultrasonic wave transmitted from the ultrasonic element 44 that has an angle with respect to the Z direction is directed to the flow path 20 via the communication path 52, and is repeatedly reflected by the inner walls of the flow path 20, so that the standing wave SW in the Y direction is generated in the flow path 20.

Fourth Modification

The specific configuration of the ultrasonic wave generation unit 40 described in each of the above embodiments can be modified in various ways.

For example, the element substrate 41 may be disposed outside the through hole 311 of the flow path substrate 30. In this case, the opening portion 411 of the element substrate 41 overlaps the through hole 311 of the flow path substrate 30, and a lower surface of the element substrate 41 is in liquid-tight contact with an upper surface of the flow path substrate 30.

The ultrasonic wave generation unit 40 may not include the element substrate 41, and the vibration film 42 may be provided at the flow path substrate 30. In this case, a portion of the vibration film 42 overlapping the through holes 311, 331 of the flow path substrate 30 constitutes the vibrator 421.

Fifth Modification

In each of the above embodiments, the standing wave SW is generated in the width direction (Y direction) of the flow path 20 as one direction orthogonal to the flowing direction of the fluid S. However, the standing wave SW may be generated in the depth (Z direction) of the flow path 20. In this case, a configuration can be applied in which the Y direction and the Z direction that are described in the above embodiments are appropriately replaced with each other.

Overview of Present Disclosure

A fluid device according to an aspect of the present disclosure includes: a flow path through which a fluid flows; and an ultrasonic element configured to transmit an ultrasonic wave to the fluid to generate a standing wave in the fluid in the flow path along a first direction orthogonal to a flowing direction of the fluid. The ultrasonic element includes a vibrator having a fluid contact surface that comes into contact with the fluid, and a piezoelectric element that is provided at the vibrator and that is configured to flexurally vibrate the vibrator in a normal direction of the fluid contact surface. When a thickness of the vibrator in the normal direction is t, a sound velocity of a medium of the fluid is C, an average sound velocity of a longitudinal wave transmitted in the vibrator is C', a dimension of the flow path in the first direction is L, and a mode order of the standing wave is n, the following expression is satisfied.

$$t < \frac{C'}{C} \times \frac{L}{2n}$$

In such a configuration, since the fluid contact surface of the vibrator comes into contact with the fluid, another member is not interposed in a propagation path of the ultrasonic wave from the ultrasonic element to the fluid. That is, the ultrasonic wave is directly transmitted from the ultrasonic element to the fluid.

The thickness of the vibrator in contact with the fluid is formed in a range of the above expression, so that generation of the longitudinal wave in the vibrator and propagation of the longitudinal wave from the vibrator to the fluid are prevented.

According to the above configuration, matching of acoustic impedances between the vibrator of the ultrasonic element and the fluid in contact with the vibrator is achieved, so that propagation efficiency of the ultrasonic wave from the ultrasonic element to the fluid can be improved. Accordingly, a drive voltage and a driving frequency that are applied to the piezoelectric element can be set to be lower than those in the related art, and a width of the flow path in which the standing wave is generated can be wider than that in the related art. As a result, a volume flow rate of the fluid that can be treated using the fluid device can be increased.

In the fluid device according to the present aspect, when a dimension of the vibrator in a short-side direction orthogonal to the normal direction is W, an average Young's modulus of the vibrator when a Poisson's ratio is 0.3 is E', and the sound velocity of the medium of the fluid is C, the following expression is satisfied.

$$8.03 \times 10^{-3} \times W \times E'^{-\frac{1}{3}} \times \left(\frac{n}{2} \times \frac{C}{L}\right) \leq t$$

According to such a configuration, by forming the vibrator as thin as possible, the vibrator can be prevented from being damaged when the piezoelectric element is driven while the propagation efficiency of the ultrasonic wave from the ultrasonic element to the fluid is improved.

In the fluid device according to the present aspect, the vibrator faces an antinode region corresponding to any antinode in the standing wave.

According to such an arrangement, the propagation efficiency of the ultrasonic wave from the ultrasonic element to the fluid can be further improved.

In the fluid device according to the present aspect, the vibrator is disposed such that a thickness direction of the vibrator is along the first direction.

Accordingly, a main transmission direction of the ultrasonic wave from the ultrasonic element coincides with a propagation direction of the ultrasonic wave combining the standing waves in the flow path, so that generation efficiency of the standing wave can be further improved.

In the fluid device according to the present aspect, a dimension of the flow path in a second direction orthogonal to the flowing direction and the first direction is smaller than the dimension of the flow path in the first direction.

Accordingly, generation of the standing wave in the second direction can be prevented, and the standing wave in the first direction can be suitably generated.

The fluid device according to the present aspect further includes: a pressure chamber configured to store the fluid; and a communication path that is formed along the first direction and that communicates the flow path with the pressure chamber. The ultrasonic element is disposed such that the fluid contact surface is in contact with the fluid in the pressure chamber.

According to such a configuration, the ultrasonic wave transmitted by the ultrasonic element is not defeated by the ultrasonic wave reflected in the flow path and returning to the vibrator via the communication path, and a pressure in the pressure chamber is increased, so that an acoustic power can be added to the inside of the flow path. Accordingly, it is easy to generate a standing wave having a higher acoustic power.

What is claimed is:

1. A fluid device, comprising:
a flow path substrate with a flow path through which a fluid flows; and
a plurality of ultrasonic elements having a first ultrasonic element and a second ultrasonic element, and the plurality of ultrasonic elements are configured to transmit an ultrasonic wave of a plurality of ultrasonic waves, and to generate a standing wave in the fluid in the flow path along a first direction orthogonal to a flowing direction of the fluid, wherein each of the plurality of ultrasonic elements includes:
an element substrate with a plurality of first opening portions, wherein
the plurality of first opening portions are formed in an array for the element substrate,
the plurality of first opening portions penetrate the element substrate along a thickness direction of the element substrate, and
an outer peripheral surface of the element substrate is in contact with an inner peripheral surface of a second opening portion of the flow path substrate;
a vibrator supported by the element substrate and overlapping each of the plurality of the first opening portions, wherein the first ultrasonic element is disposed on an opening portion of the plurality of first opening portions for a first antinode region corresponding to a first antinode of the standing wave,
the second ultrasonic element is disposed on another opening portion of the plurality of first opening portions for a second antinode region corresponding to a second antinode of the standing wave,
the opening portion of the plurality of first opening portions and the other opening portion of the plurality of first opening portions are different,
a phase of a driving frequency of a second ultrasonic wave of the second ultrasonic element is opposite to a phase of a driving frequency of a first ultrasonic wave of the first ultrasonic element,
the vibrator has a fluid contact surface that is in contact with the fluid, and
the vibrator closes each of the plurality of the first opening portions of the element substrate; and
a piezoelectric element that is provided at the vibrator and that is configured to generate flexural vibration to the vibrator in a normal direction of the fluid contact surface, wherein $$t < \frac{C'}{C} \times \frac{L}{2n}$$

wherein a thickness of the vibrator in the normal direction is t, a sound velocity of the fluid is C, an average sound velocity of a longitudinal wave transmitted in the vibrator is C', a dimension of the flow path in the first direction is L, and a mode order of the standing wave is n.

2. The fluid device according to claim 1, wherein $$8.03 \times 10^{-3} \times W \times E'^{-\frac{1}{3}} \times \left(\frac{n}{2} \times \frac{C}{L}\right) \leq t$$

wherein a dimension of the vibrator in a direction orthogonal to the normal direction is W, an average Young's modulus of the vibrator when a Poisson's ratio is 0.3 is E', and the sound velocity of the fluid is C.

3. The fluid device according to claim 1, wherein
the vibrator is disposed on regions corresponding to the first antinode and the second antinode of the standing wave.

4. The fluid device according to claim 1, wherein
the vibrator is disposed such that the normal direction of the fluid contact surface is along the first direction.

5. The fluid device according to claim 1, wherein
a dimension of the flow path in a second direction orthogonal to the flowing direction and the first direction is smaller than the dimension of the flow path in the first direction.

6. The fluid device according to claim 2, wherein
a dimension of the flow path in a second direction orthogonal to the flowing direction and the first direction is smaller than the dimension of the flow path in the first direction.

7. The fluid device according to claim 3, wherein
a dimension of the flow path in a second direction orthogonal to the flowing direction and the first direction is smaller than the dimension of the flow path in the first direction.

8. The fluid device according to claim 4, wherein
a dimension of the flow path in a second direction orthogonal to the flowing direction and the first direction is smaller than the dimension of the flow path in the first direction.

9. The fluid device according to claim 1, further comprising:
a pressure chamber configured to store the fluid; and
a communication path that is formed along the first direction and that communicates the flow path with the pressure chamber, wherein
the plurality of ultrasonic elements are disposed such that the fluid contact surface is in contact with the fluid in the pressure chamber.

* * * * *